J. R. WORSWICK & E. LEWIS.
Swing-Joints for Pipes.

No. 136,577. Patented March 4, 1873.

Witnesses
Edmund Masson
John R. Young

Inventor.
J. R. Worswick and E. Lewis
by Prindle and Co. their Attys

UNITED STATES PATENT OFFICE.

JAMES R. WORSWICK AND EDWARD LEWIS, OF CLEVELAND, OHIO.

IMPROVEMENT IN SWING-JOINTS FOR PIPES.

Specification forming part of Letters Patent No. 136,577, dated March 4, 1873.

*To all whom it may concern:*

Be it known that we, JAMES R. WORSWICK and EDWARD LEWIS, of Cleveland, in the county of Cuyahoga and State of Ohio, have invented certain new and useful Improvements in Swing-Joints for Pipes; and do hereby declare that the following is a full, clear, and exact description thereof, reference being had to the accompanying drawing making a part of this specification, in which—

Figure 1:
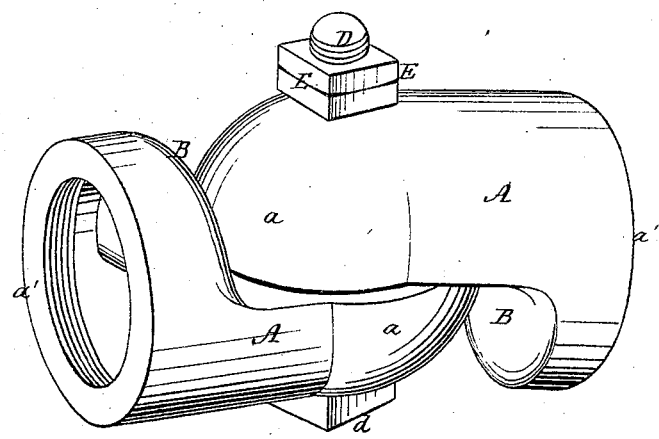
Figure 2:
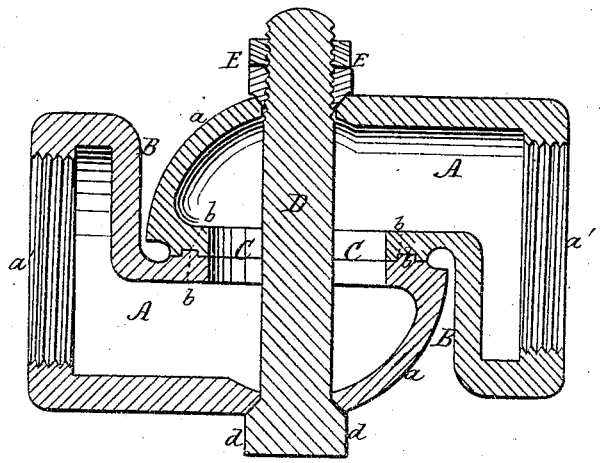

Figure 1 is a perspective of our improved device, and Fig. 2 is a central longitudinal section of the same.

Letters of like name and kind refer to like parts in each of the figures.

The principal object of our invention is to produce a swing-joint that, while perfectly flexible in one direction, shall not render necessary a change of the lines of the pipes at their points of attachment; to which end said invention consists, principally, in a swing-joint in which the pipe-openings, when in line with each other, have a common center, substantially as and for the purpose hereinafter specified. It consists, further, in the peculiar construction of the sections of the device, and their combination by means of a pivotal bolt, substantially as and for the purpose hereinafter shown.

In the annexed drawing, A represents one of the sections of the joint, having exteriorly the form of a short cylinder with one rounded or semi-spherical end, *a*, while its opposite end *a'* is open. Upon one side of the section its wall is depressed so as to form a right-angled recess, B, which extends from the rounded end *a* to within a short distance of the opposite end *a'*, and has its principal face in a line with the longitudinal axis of said section. Within or upon the principal face of the recess B is formed a circular bearing, *b*, which may have any desired shape transversely, provided that it corresponds to the bearing of the opposite section, and in connection therewith forms a steam-tight joint. An opening, C, provided in and through the wall of each section, and within the line of the bearings *b*, affords communication between their interiors when said sections are united. The sections thus constructed are united by means of a bolt, D, which passes through the centers of the semi-spherical ends in a line at a right angle to the plane of the bearings *b*.

The openings through which the ends of the bolt passes are, preferably, rendered steam-tight by being countersunk exteriorly, and having the head *d* and nut E provided with correspondingly-shaped bearings, which fit into and fill said countersinks; but, if desired, any other means for forming a joint may be employed.

A suitable attachment for pipes, formed within or upon the ends *a'* of the sections A, completes the device, the operation of which will be readily understood.

The advantages obtained by this construction of parts are as follows:

First, it enables pipes to be connected without changing the relative lateral position of their ends, by which means the device is applicable in many places where the usual joint, having an offset, could not be used.

Second, when used as a swing-joint the device may have any degree of motion upon or around its axis less than two-thirds of a revolution; while, for use as an expansion-joint, it is not injuriously affected by the action of fire, and, consequently, can be employed within a furnace where the variable temperature, and, more especially, the direct contact of heated gases, would destroy an ordinary joint.

Third, while possessing the above-named advantages, the device offers but a slight obstruction to the passage of liquids or steam, is durable, its parts are few and simple in construction, and it can be furnished at a comparatively low rate.

Having thus fully set forth the nature and merits of our invention, what we claim as new is—

1. The sections A and A, constructed as shown, and connected together so that when placed in a line with each other their open ends *a'* shall have a common center, substantially as and for the purpose specified.

2. The swing or expansion joint shown, consisting of the sections A and A, provided each with a recessed side, B, a bearing, *b*, and an opening, C, and combined by means of the bolt D, substantially as and for the purpose set forth.

In testimony that we claim the foregoing we have hereunto set our hands this 21st day of December, 1872.

J. R. WORSWICK.
EDWARD LEWIS.

Witnesses:
AUG. G. KIEL,
JAMES QUAYLE.